June 22, 1937. R. C. JACOBS 2,084,584
GLARE SHIELD BRACKET
Original Filed Sept. 14, 1934
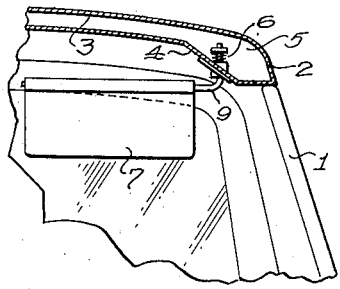
Fig. 1.
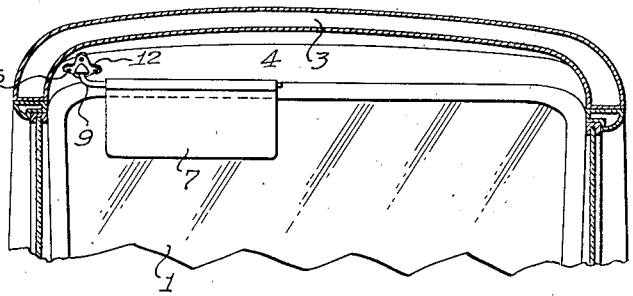
Fig. 2.
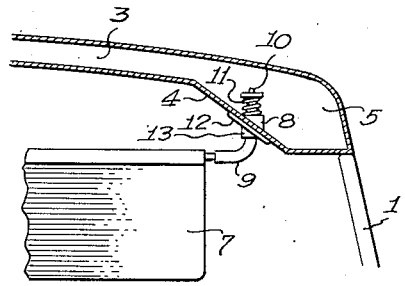
Fig. 3.
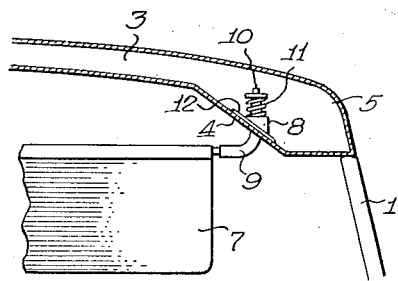
Fig. 4.
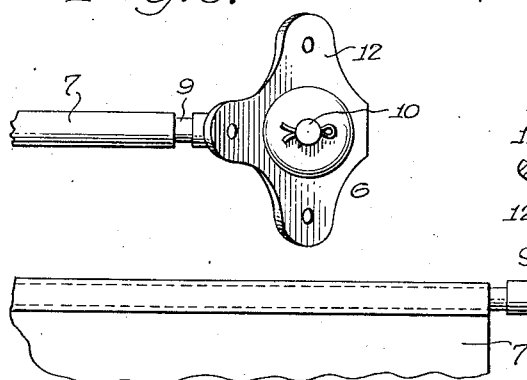
Fig. 6.
Fig. 5.
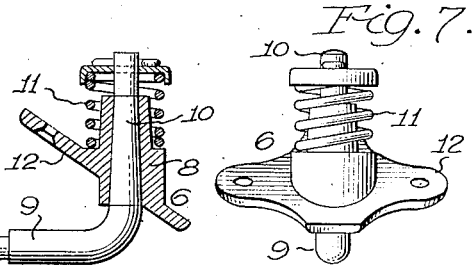
Fig. 7.
Inventor
Rex C. Jacobs,
By Barthel & Barthel
Attorneys Patented June 22, 1937

2,084,584

UNITED STATES PATENT OFFICE 2,084,584

GLARE SHIELD BRACKET

Rex C. Jacobs, Detroit, Mich.

Original application September 14, 1934, Serial No. 742,575. Divided and this application December 28, 1936, Serial No. 117,860

12 Claims. (Cl. 296—97)

This invention relates to glare shields and has for its principal object to provide a bracket therefor adapted for partial or total concealment in a vehicle top, and is a division of my copending application Serial No. 742,575, filed September 14, 1934.

It will be understood that it is the desire of manufacturers to attain neatness and clearness of lines and accessories interiorly of a vehicle body. Heretofore glare shield brackets have simply been screwed or otherwise fastened to the interior of a body after completion thereof, the bracket being wholly visible and not particularly attractive to the eye. To make this bracket attractive in appearance would involve considerable expense. The principal object of this invention is to teach the construction of a strong and efficient bracket which may be so concealed that the cost of improving its appearance is negligible.

More particularly, the object of this invention is to provide a bent arm glare shield holder having a tapered end for use as a hinge member, and to provide a second hinge member for cooperation therewith, both hinge members being adapted for concealment in a vehicle top, the arm extending above the windshield of the vehicle in conventional manner.

Other objects and advantages will become hereinafter more fully apparent as reference is had to the accompanying drawing wherein my invention is illustrated and in which—

Figure 1 is a vertical section through a top showing my improved glare shield bracket installed therein;

Fig. 2 is a vertical section through a top taken at right angles to the view of Fig. 1 and also showing my improved bracket;

Figs. 3 and 4, are views similar to Fig. 1 showing slightly different forms of brackets;

Fig. 5 is an enlarged view of the bracket of Figs. 1 and 2 with the socket member shown in section;

Fig. 6 is a plan view of the device of Fig. 5, and

Fig. 7 is an elevation taken from the right end of Fig. 6.

More particularly I indicates the windshield of a vehicle which terminates at a header 2 constituting the forward part of a vehicle roof 3, the lower wall of the header being shown as defining the upper limit of the windshield opening. In the case of sloping windshields, the top may have an interior inclined surface 4. I propose to employ the open space 5 in the top to house a bracket 6 for a glare shield 7. As illustrated in Figs. 5, 6 and 7, the bracket 6 is composed of a tapered socket or hinge member 8 having a bent arm 9 with a tapered end 10 for fitting into the socket 8. A spring 11 holds the parts 8 and 10 in pressure contact so that a frictional hinge is provided for swinging the arm 10 which carries the shield 7 the upper margin of which swings through an arc extending in substantially a horizontal plane lying on or above the upper defining wall of the windshield opening. It will be understood that the shield 7 is hingedly mounted on the rod 9 and frictionally held for angular adjustment on a horizontal axis.

The socket 8 is angularly arranged with respect to an integral plate portion 12, this plate being adapted for attachment as by screwing or riveting or otherwise securing to the inclined surface 4. This plate may be outwardly of the space 5 as illustrated in Figs. 1 and 3 or inwardly thereof as illustrated in Fig. 4. In the first instance the bracket is partially concealed and in the latter instance it is wholly concealed.

What I claim is:—

1. In combination, a vehicle body having a windshield opening and having a wall leading upwardly from the upper rear limits of said opening, a glare shield, and means including a vertical pivot for supporting said shield to swing through a horizontal arc below said pivot between an active position in rear and substantially parallel with such rear limits of the opening to an inactive position within the body, said means including an arm on which the shield is frictionally held for angular adjustment on a horizontal axis, said means having its pivot carried by and extending through said wall with the pivot location such that the swinging arc of the upper margin of the glare shield will extend in a horizontal plane lying on or above the upper defining wall of said opening, whereby the upper margin of the shield in active position will lie above the upper line of operator vision through said opening within the dimensions of the shield.

2. An assembly as in claim 1 characterized in that the upwardly extending wall is inclined, and that the means pivot point is located in rear of the juncture of such wall with the defining wall of the opening.

3. An assembly as in claim 1 characterized in that the vertical pivot formation is provided by a bearing bracket carried by the upwardly-leading wall and adapted to receive an end zone of the shield-supporting arm, with the bracket and arm co-operating frictionally to permit adjustment of the arm to positions at or intermediate the extremes of swinging movement of the arm.

4. An assembly as in claim 1 characterized in that the vertical pivot formation is provided by a bearing bracket carried by the upwardly-leading wall and adapted to receive an end zone of the shield-supporting arm, with the bracket and arm having co-operating tapered faces, means being provided to permit yieldable movement of the arm zone within the bearing in the direction of the taper axis, whereby the arm is adjustable to positions at or intermediate the extremes of swinging movement of the arm.

5. An assembly as in claim 1 characterized in that the upwardly extending wall is inclined, with the means pivot located in rear of the juncture of such wall with the defining wall of the opening, the vertical pivot formation including a bearing bracket carried by such inclined wall and adapted to receive the means pivot, the bearing bracket having a securing wall presenting a surface substantially parallel with such inclined wall with the angularity between surface and bearing axis varied from the angularity of a right angle.

6. The combination of an automobile top carrying a defining wall of the windshield opening, a wall leading rearwardly and upwardly from such defining wall and a glare shield bracket including a hinge carried by and partially concealed by said upwardly leading wall, and an arm having movement confined to a horizontal arc extending from said hinge interiorly of the automobile for supporting a glare shield, said arm being parallel with said glare shield for rotation of said shield therearound.

7. In combination, a vehicle top carrying a defining wall of the windshield opening, a wall leading rearwardly and upwardly from such defining wall, an arm for supporting a glare shield having one end thereof bent, the bent end of said arm being carried by and projecting into said rearwardly extending wall and constituting a hinge member, and a second hinge member for engagement with said arm substantially concealed within said rearwardly extending wall.

8. In combination, a vehicle top carrying a defining wall of the windshield opening, a wall leading rearwardly and upwardly from such defining wall, an arm for supporting a glare shield having one end bent normal to the remainder thereof, said bent end being tapered, a tapered socket for receiving and co-operating with the taper of said bent end, and means for retaining said bent end in assembled relation with said socket, said socket being substantially concealed within said top and carried by said upwardly leading wall, said arm being inserted longitudinally through said shield and constituting a hinge member about which said shield is rotatable.

9. In combination, a vehicle top carrying a defining wall of the windshield opening, a wall leading rearwardly and upwardly from such defining wall, an arm for supporting a glare shield having a bent end, said bent end being tapered and projecting into said top, a tapered socket member residing substantially within said top and carried by said rearwardly leading wall for receiving and co-operating with the taper of said bent end, and a retaining plate integral with said socket for securing said socket to the wall of said top.

10. In combination, a vehicle top carrying a defining wall of the windshield opening, a wall leading rearwardly and upwardly from such defining wall, an arm for a glare shield having a bent end extending into said top, said bent end constituting a hinge member, a second hinge member for receiving said bent end, and a retaining plate integral with said second hinge member for securing said second hinge member to said top, said retaining plate being adjacent the bottom of said second hinge member and residing outwardly of said rearwardly leading wall, the remainder of said second hinge member being substantially concealed within said top.

11. In combination, a vehicle top carrying a defining wall of the windshield opening, a wall leading rearwardly and upwardly from such defining wall, an arm for a glare shield having a bent end extending into said top, said bent end constituting a hinge member, a second hinge member for receiving said bent end, and a retaining plate integral with said second hinge member for securing said second hinge member to the top, said retaining plate being adapted for attachment to said rearwardly leading wall interiorly thereof whereby said second hinge member is entirely concealed within said top.

12. In combination, a vehicle top having an inclined surface interiorly of the vehicle, an arm for a glare shield having a bent end for projection through the inclined surface of said top, said bent end constituting a hinge member, a second hinge member within said top, and a retaining plate integral with said second hinge member for securing said second hinge member to the inclined surface of said top, said retaining plate being angularly disposed to the hinge axis of said second hinge member.

REX C. JACOBS.